United States Patent
Stanglmaier et al.

(10) Patent No.: US 6,637,381 B2
(45) Date of Patent: Oct. 28, 2003

(54) OXYGENATED FUEL PLUS WATER INJECTION FOR EMISSIONS CONTROL IN COMPRESSION IGNITION ENGINES

(75) Inventors: Rudolf H. Stanglmaier, San Antonio, TX (US); Daniel W. Dickey, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/971,916

(22) Filed: Oct. 9, 2001

(65) Prior Publication Data

US 2003/0066497 A1 Apr. 10, 2003

(51) Int. Cl.[7] .................................................. F02B 47/00
(52) U.S. Cl. .................................................... 123/25 F
(58) Field of Search .............................. 123/25 F, 25 J, 123/25 E, 25 C, 1 A

(56) References Cited

U.S. PATENT DOCUMENTS

| | | | |
|---|---|---|---|
| 4,411,768 A | 10/1983 | Unger et al. | 208/59 |
| RE32,265 E | 10/1986 | Unger et al. | 208/59 |
| 4,744,796 A | 5/1988 | Hazbun et al. | |
| 5,245,953 A | 9/1993 | Shimada et al. | |
| 5,271,370 A | 12/1993 | Shimada et al. | |
| 5,412,946 A | 5/1995 | Oshima et al. | |
| 5,584,894 A | 12/1996 | Peter-Hoblyn et al. | |
| 5,680,764 A | 10/1997 | Viteri | |
| 5,762,033 A * | 6/1998 | Rembold et al. | 123/25 C |
| 5,873,916 A | 2/1999 | Cemenska et al. | |
| 5,906,664 A * | 5/1999 | Basu et al. | 44/446 |
| 5,951,722 A | 9/1999 | Sanders et al. | |
| 5,997,690 A | 12/1999 | Woodrum | |
| 6,056,793 A | 5/2000 | Suppes | |
| 6,119,664 A * | 9/2000 | McCandless | 123/527 |
| 6,240,883 B1 * | 6/2001 | Ahern et al. | 123/25 R |
| 6,276,334 B1 | 8/2001 | Flynn et al. | 123/435 |
| 6,302,929 B1 | 10/2001 | Gunnerman | 44/302 |
| 6,460,491 B1 * | 10/2002 | Stanglmaier et al. | 123/25 J |

FOREIGN PATENT DOCUMENTS

| | | |
|---|---|---|
| GB | 2 066 288 A | 7/1981 |
| WO | WO 95/27021 | 10/1995 |
| WO | WO 99/42718 | 8/1999 |

OTHER PUBLICATIONS

"The Green Diesel" Marine Engineers Review, Institute of Marine Engineers, London, GB, (Jun. 1997), pp. 18, 20, 22–24, ISSN: 0047–5955, Figure 3.

Corgard, Daniel D; Reitz, Rolf D: "Effects of Alternative Fuels and Intake Port Geometry on HSDI Diesel Engine Performance and Emissions" SAE Technical Paper Series No. 2001–01–0647, Mar. 5–8, 2001, pp. 1–15, XP002225917, SAE 2001 World Congress, Detroit, Michigan, US, the whole document.

Nazha M A A et al.: "The Use of Emulsion, Water Induction and EGR for Controlling Diesel Engine Emissions" SAE Technical Paper Series No. 2001–01–1941, May 7–9, 2001, XP002225916 International Spring Fuels & Lubricants Meeting & Exhibition, Orlando, Florida, US, the whole document.

* cited by examiner

Primary Examiner—Henry C. Yuen
Assistant Examiner—Hyder Ali
(74) Attorney, Agent, or Firm—Oliff & Berridge, PLC

(57) ABSTRACT

A fuel injection system and method to reduce NOx and smoke emissions from a compression ignition engine by co-injecting water and an oxygenated fuel during steady state and transient engine conditions.

17 Claims, 3 Drawing Sheets

OXYGENATED FUEL PLUS WATER INJECTION FOR EMISSIONS CONTROL IN COMPRESSION IGNITION ENGINES

BACKGROUND OF THE INVENTION

1. Field of Invention

This invention relates generally to a fuel injection system and method to control emissions from a Diesel engine, and more particularly to a method that controls smoke (soot) and/or nitrogen oxide (NOx) emissions by co-injecting a mixture of oxygenated fuel and water during steady state and engine transient conditions.

2. Description of Related Art

Diesel engine and truck manufacturers are under increasing pressure to reduce smoke and NOx levels in the exhaust. Current generation engines rely on high-pressure injection systems, electronic controls, and exhaust gas recirculation (EGR) to mitigate smoke and NOx emissions while attempting to maintain high fuel efficiency. However, the most significant gains from these technologies have probably already been achieved. Water injection into the cylinder is not widely used in current engines, but is well known to be an effective means of reducing NOx and smoke emissions.

Improvements in fuel formulations are likely to yield significant emissions benefits in the future, as research in this area is still relatively new. Recent tests have shown that alternative fuels and mixtures thereof can significantly reduce smoke and NOx simultaneously, while preserving the high efficiency and high power density of the Diesel-cycle engine.

In-cylinder water injection into the combustion chamber of a Diesel engine is one well-recognized method for reducing NOx and smoke emissions. Water injection either as a fuel/water emulsion, or as a separate fluid, can reduce NOx and smoke emissions. The most common approaches have involved the use of emulsified fuels, stored in a tank or mixed in-line, or water injection through a nozzle separate from the fuel injector. When using emulsified fuels, the water content cannot be altered quickly enough for transient control. When injected separately, the water injection amount can be varied quickly, but this method does not reduce smoke emissions appreciably because water acts primarily as a diluent. In addition, water does not contribute appreciably to the energy release.

Using oxygenated fuel is another recognized approach for reducing particulate smoke emissions from Diesel engines. An oxygenated fuel is a fuel in which oxygen atoms are chemically bound within the fuel structure. The oxygen bond in the oxygenated fuel is energetic and provides a chemical energy that results in no loss of efficiency during combustion. However, oxygenated fuels have only a minor effect on NOx emissions.

An exhaust gas recirculation (EGR) system is yet another recognized alternative for reducing NOx emissions levels from internal combustion engines. The exhaust gas recirculation system recirculates exhaust gases through the intake manifold to be mixed with fresh intake air and burned again. The exhaust gas recirculation system dilutes the air and fuel mixture. Consequently, the peak combustion temperature is lowered and NOx production is decreased. EGR has a detrimental effect on soot and smoke emissions.

SUMMARY OF THE INVENTION

The present invention is directed to overcoming the problems set forth above. This invention relates to a method for simultaneously reducing NOx and smoke emissions from a compression ignition (e.g., a Diesel cycle) engine. The invention provides for the combined use of water injection and an oxygenated fuel. This is particularly suitable for engines that use exhaust gas recirculation (EGR), but is not limited to this category of engine.

According to one aspect of the invention, oxygenated fuel and water are co-injected into the combustion chamber of a compression ignition engine. This results in a synergistic improvement in both the NOx emissions and the particulate (soot or smoke) emissions, as compared to the use of oxygenated fuel alone, or co-injection of water and regular fuel. The co-injection can be conducted with or without exhaust gas recirculation (EGR).

The oxygenated fuel and water can be injected through a single injector, or the oxygenated fuel can be injected through a first injector, while the water is injected through a second injector.

The water can be introduced as water alone, or as part of a fuel emulsion. When a fuel emulsion is used, the fuel emulsion is the main fuel supply, whereas the oxygenated fuel is a secondary fuel supply.

BRIEF DESCRIPTION OF THE DRAWINGS

A more complete understanding of the method and operation of the present invention may be had by reference to the following detailed description when taken in conjunction with the accompanying drawings, wherein.

DETAILED DESCRIPTION OF PREFERRED EMBODIMENTS

In accordance with the present invention, there is disclosed an improved method and system for reducing NOx and smoke emissions from a compression ignition engine (e.g., Diesel) during steady state and transient conditions in each combustion cycle.

In accordance with the present invention, both an oxygenated fuel and water are injected into an internal combustion chamber of a compression ignition engine. This combination provides synergistic benefits compared to the injection of either oxygenated fuel or water injection alone.

Figure 1:
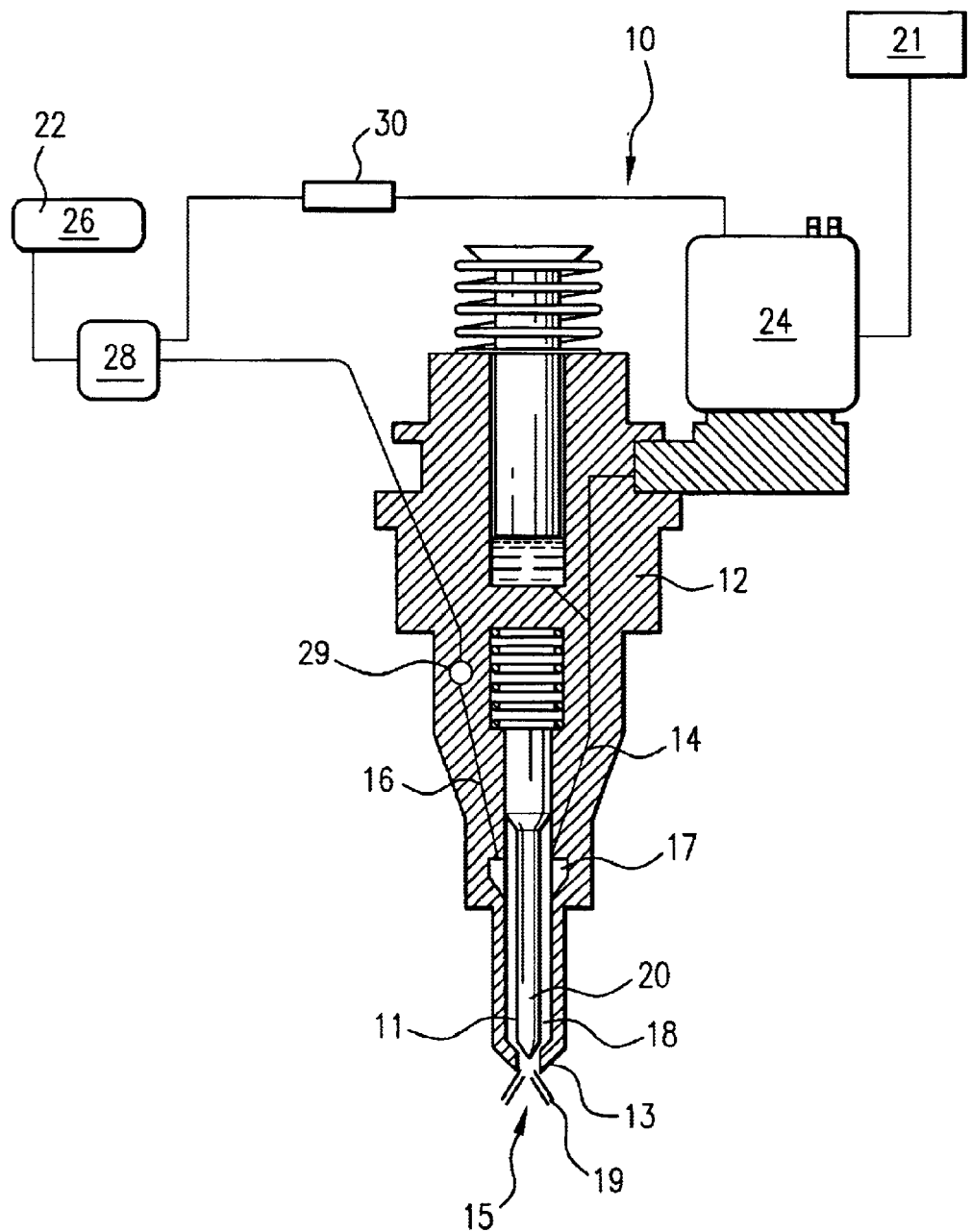
FIG. 1 illustrates a fuel injection system for combined injection of water and an oxygenated fuel in accordance with the present invention.

FIG. 1 illustrates a fuel injection system that supplies a combustible fuel mixture 19 into a combustion chamber (not shown) of an internal combustion engine. The combustible fuel mixture 19 is comprised of a mixture of oxygenated fuel 21 and an auxiliary fluid 22. The auxiliary fluid 22 can be water and/or a water/fuel emulsion. The auxiliary fluid 22 is supplied through a first supply channel 16. The oxygenated fuel 21 is supplied through a second supply channel 14.

The oxygenate for the oxygenated fuel 21 can be chosen from one of the following oxygenated compounds: a dymethoxymethane (DMM or methylal), a dymethil ether (DME), a diethyl ether (DEE), a dimethylacetal (DMA), a diethylene-glycol-dimethyl-ether (DGM), an ethylene glycol mono n-butyl ether (ENB), a 2-ethylexyl acetate (EHA), a di-n-butyl ether (DBE), a methyl soy ester (MSE), a decanoic acid (DCA), an octanol, an ethanol, a methanol, or any other type of oxygenated compound. The water/fuel emulsion includes emulsified mixture of Diesel fuel and water. Water is co-injected with the oxygenated fuel according to the engine operating conditions. The primary source of fuel can be a water/fuel emulsion (which would then be injected through channel 14). The secondary source of fuel would be the oxygenated fuel that is co-injected through channel 16. Alternatively, the oxygenated fuel injected through channel 14 could be the sole source of fuel.

The fuel injection system has a dual-fuel injector 10, a spill valve 24, a solenoid operated valve 28, a water manifold 26 and a controller (electronic control unit (ECU)) 30. The controller 30 is electrically connected to the solenoid operated valve 28 for controlling an amount of the auxiliary fluid delivered into the dual-fuel injector 10. The controller 30 is also electrically connected to the spill valve 24 for controlling the amount of the oxygenated fuel being delivered to the dual-fuel injector 10. The control valve 28 and the spill valve 24 are opened and closed under the direction of the controller 30.

The dual-fuel injector 10 has an injector body 12, a needle 20 and a nozzle needle cone 13. The nozzle needle cone 13 defines a valve seat for the needle 20. The needle 20 and the nozzle needle cone 13 form an injection nozzle 15. The needle 20 moves back and forth to open and close the injection nozzle 15 along the axis of the duel-fuel injector 10. The needle 20 is moved up by the fuel pressure in the volume 11 when the spill valve 24 is closed. The needle 20 is surrounded in a lower portion of the dual-fuel injector 10 by a fuel volume 11. The fuel volume 11 is defined by an annular nozzle chamber 18 and an annular mixing chamber 17 that surround the needle 20.

Both the first supply channel 16 and the second fuel supply channel 14 extend through the injector body 12 and terminate in the annular mixing chamber 17. The first supply channel 16 is coupled to the water manifold 26 through the solenoid operated valve 28. Pressurized water (or water/fuel emulsion) is delivered from the water manifold 26 by the solenoid operated valve 28 to the channel 16. A check valve 29 is disposed in the water passage 16 to prevent the back flow of fuel into the water manifold 26. The second supply channel 14 is coupled to an oxygenated fuel source 21 through the spill valve 24. Pressurized fuel is supplied to the fuel channel 14 by the spill valve 24.

FIG. 1 illustrates one embodiment in accordance with this invention utilizing a dual-fuel injector 10. However, it should also be noted that the present invention is not limited to the construction embodied in FIG. 1, and may be incorporated into any other fuel injector configuration which can implement the method and system of co-injecting the two fluids, including, but not limited to using two separate injection nozzles.

It is a further aspect of the present invention to implement the co-injection of the oxygenated fuel and the water in conjunction with EGR systems, turbochargers, a supercharged engine, a boosted engine and/or a normally aspirated engine. The co-injection of oxygenated fuel and water can also be used to control steady-state and transient emissions from engines equipped with EGR, as well as engines without EGR. Although co-injection is particularly suitable for engines that use exhaust gas recirculation (EGR), co-injection is not limited to this category of engines.

Figure 2:
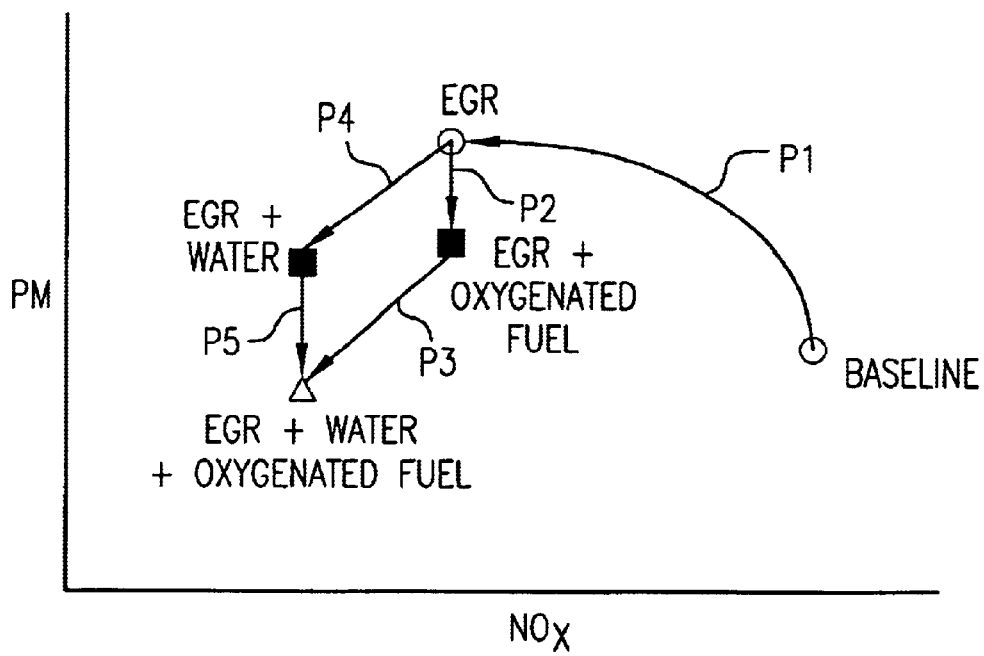
FIG. 2 illustrates the effects of co-injecting oxygenated fuel and water for emissions control in accordance with the present invention as compared to other forms of emissions control.

FIG. 2 is a graphical plot illustrating the effects of exhaust gas recirculation (EGR) and the co-injection of oxygenated fuel and water on the exhaust emissions in a compression ignition engine in accordance with the present invention. The axes of the plot are defined as the NOx concentration versus the amount of particulate matter (PM) e.g., soot or smoke.

Path P1 illustrates the effect of exhaust gas recirculation (EGR) to the baseline. The baseline is a reference point at which no additives are present in a conventional compression ignition engine. When exhaust gas recirculation (EGR) is added, the exhaust NOx concentration is reduced, however, the amount of particulate matter (PM) is increased.

Path P2 illustrates the effect of the injection of oxygenated fuel combined with exhaust gas recirculation (EGR). When the oxygenated fuel is performed in conjunction with exhaust gas recirculation (EGR), there is a further reduction in PM compared to EGR alone. The exhaust NOx concentration is not noticeably affected because oxygenated fuel has only a minor effect on exhaust NOx concentration.

Path P4 illustrates that the injection of water combined with exhaust gas recirculation (EGR) results in a reduction of the exhaust NOx concentration as well as a reduction in PM.

As indicated by the triangle in FIG. 2, when EGR is conducted along with the co-injection of water and oxygenated fuel, the lowest emissions of NOx and PM result. As illustrated by Path P3, the NOx and the PM are reduced as compared to the use of EGR and oxygenated fuel (i.e., without water). As demonstrated by Path P5, the use of EGR and the co-injection of water and oxygenated fuel results in a further reduction of NOx emissions as compared to the performance of EGR and water injection (i.e., without oxygenated fuel).

Figure 3:
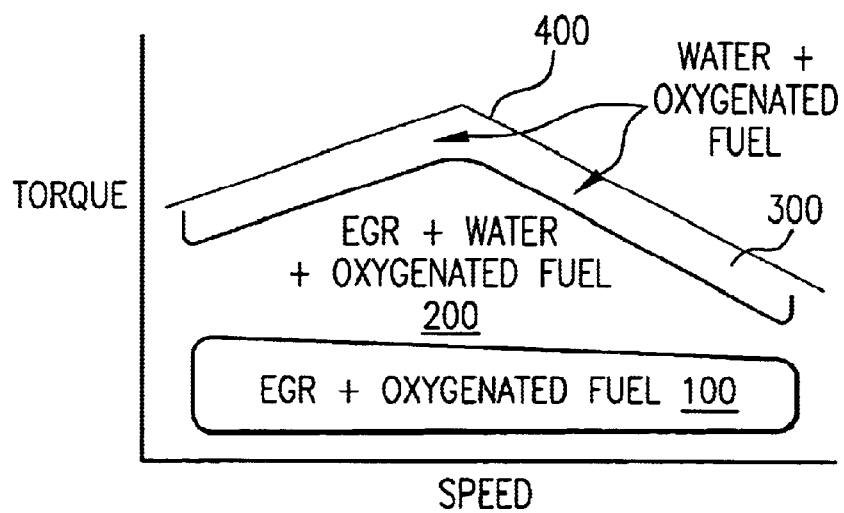
FIG. 3 illustrates a preferred example of the conditions in which exhaust gas recirculation (EGR), the injection of oxygenated fuel and the injection of water are selectively performed in accordance with the present invention.

While the use of an oxygenated fuel can achieve a reduction in PM emissions and the use of water injection can achieve a reduction in PM and NOx emissions, the combined use of an oxygenated fuel and water injection can yield much larger simultaneous reductions in PM and NOx than either strategy by itself, as illustrated in FIG. 3. A larger reduction in NOx emissions is obtained than would ordinarily be expected (i.e., the path P3 is longer than the path P4) because the reduction in PM emissions allows the injection timing of the fuel and water to be retarded relative to the engine cycle. It is well known that advances in the fuel injection timing reduce NOx emissions, but increase PM emissions.

FIG. 3 illustrates a graphical representation of a preferred relationship between the use of exhaust gas recirculation (EGR), the injection of oxygenated fuel and the injection of water. The preferred relationship effectively mitigates exhaust emissions from a Diesel engine while maintaining sufficient torque and optimizing fuel consumption, in accordance with the present invention. FIG. 3 defines a combination of additives for at least three predominant operating regions (a low-load region 100, a medium-load region 200 and a heavy-load region 300) in response to a torque (or load) and a speed (or revolution) of the Diesel engine.

In the low-loaded region 100, the preferred emission reducing additive includes a combination of exhaust gas recirculation (EGR) and an injection of oxygenated fuel. This combination of exhaust gas recirculation (EGR) and the oxygenated fuel is substantially constant in the low-loaded region 100 when the internal combustion engine operates throughout low to high speeds. Water injection at low loads can cause increased hydrocarbon emissions.

In the medium-loaded region 200 the preferred emissions reducing additive includes a combination of exhaust gas recirculation and co-injection of the oxygenated fuel and water. The relative amounts of EGR and water can be adjusted according the operating conditions of the engine within the medium-load region 200 to optimize the fuel efficiency and emissions of the engine.

In the heavy-loaded region 300 the preferred emissions reducing additive includes co-injection of the oxygenated fuel and water (i.e., without EGR). It is preferable not to use exhaust gas recirculation (EGR) within the heavy-loaded region 300 because it results in a large penalty in fuel consumption. The relative amounts of water can be adjusted according the operating conditions of the engine within the heavy-loaded region 300 to optimize the fuel efficiency and emissions of the engine.

Figure 4:
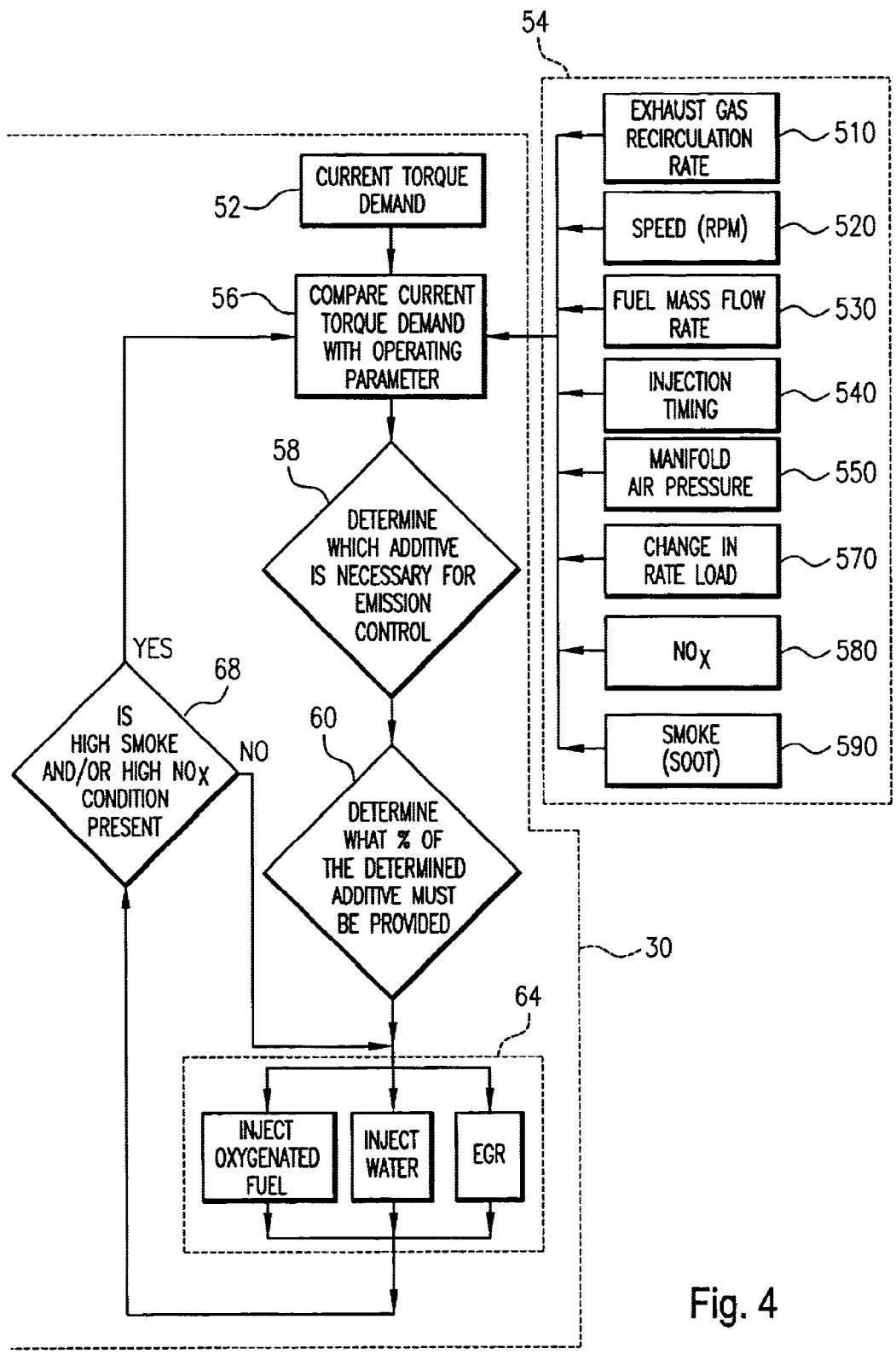
FIG. 4 illustrates an emission control method for reducing emissions by selectively co-injecting water and oxygenated fuel in accordance with the present invention.

FIG. 4 illustrates an emission control method for reducing emissions by selectively co-injecting water and oxygenated fuel during steady state and engine transient operating conditions in accordance with the present invention.

Steady state conditions are defined as those periods of engine operation when sudden changes in load or speed do not occur. To the contrary, engine transients are defined as temporary oscillations that occur in an engine as a result of a sudden change in load or speed. Changes in vehicular engines are generally governed by changes in an operator controlled fuel pedal position.

In step 52, the controller 30 determines a current torque demand. The current torque demand is a function of a number of variables, including, but not limited to an operator changing a fuel pedal position. The change in the fuel pedal causes numerous changes in a plurality of engine operating characteristics, including, but not limited to, at least one of an engine speed (rpm), a torque, and an engine load. The current torque demand is detected during either steady state or transient engine operating conditions.

In step 54, the controller 30 monitors by detecting at least one engine operating parameter with at least one engine detection device. The detected engine operating parameters detected during each combustion cycle of the engine include, but are not limited, to an exhaust gas recirculation rate detector 510, a speed (rpm) detector 520, a fuel mass flow rate detector 530, an injection timing detector 540, a manifold air pressure detector 550, a change in the rate of load detector 570, a NOx detector 580, a smoke detector 590, etc.

In step 56, the controller 30 compares the detected engine operating parameter with the current torque demand to obtain a determined value.

In step 58, based on the determined value, the controller 30 determines which of the additives is to be combined with the injection of the oxygenated fuel to provide the requisite control of emissions. The additives include, but are not limited to, exhaust gas recirculation (EGR), water injection, and injection of emulsified fuel. The controller 30 can make a determination based on a real-time arithmetic derivation (based on the factors compared), a look up table or a graph defining preferred additives. For example, the graph in FIG. 3 defines a combination scheme for additives in relation to a current torque demand versus a current speed of the engine.

In step 60, the controller 30 determines what percentage of the determined additives must be provided. The actual amount of injected water and/or injected oxygenated fuel is determined by the ECU 30. The amount of water is about 0% to about 60% by volume of the total injected liquid, preferably about 10% to about 40% by volume, more preferably about 20% to about 30%, depending on the operating conditions. The amount of oxygenated fuel is about 40% to about 90% by volume of the total injected liquid, preferably about 70% to about 80% by volume, depending on the operating conditions. A preferred amount of oxygen within the oxygenated fuel is at least about 4% by molecular weight.

In step 64, the determined additives and their respective percentages are injected into the combustion chamber of the Diesel engine.

In step 68, the controller 30 determines whether a high smoke condition and or a high NOx condition is present. If the controller 30 determines that a high smoke condition and or a high NOx condition is present, the control proceeds to step 56 to compare new detected current engine operating parameters with a new current torque demand. Otherwise, the controller 30 continues to inject the additives determined in step 58 and in accordance with the percentages for the additives determined in step 60.

In step 68, the determination as to whether a high smoke and/or a high NOx condition exists can be made by one of several different methods. On-board detectors, e.g., the NOx detector 580 and the smoke detector 590 quantitatively measure a smoke opacity and a NOx content of a vehicle to determine the high smoke and/or high NOx condition. Alternatively, a predetermined table can be established for engine operating conditions at which high smoke and/or high NOx are produced. For example, the engine operating conditions can include, but are not limited to at least one of a change rate of load demand, a fuel flow, and an injection timing. The detected engine operating parameter can be compared with the predetermined table values representative of engine operating conditions during which the high smoke and/or NOx conditions exist.

According to the present invention, the controller 30 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

The use of oxygenated fuels in combination with water injection can produce a larger reduction in NOx and PM emissions from a Diesel engine than the sum of the emissions reductions achievable through either approach used individually. An even larger reduction in emissions can be obtained through the use of oxygenated fuel, water injection and exhaust gas recirculation (EGR). This synergistic effect is due to the practical implementation constraints in Diesel engines. In a Diesel engine, the timing of the fuel injection event relative to the engine cycle determines the start of combustion. The injection timing has a large influence on the emissions and fuel efficiency of the engine such that advancing the injection timing relative to some baseline results in lower PM emissions but higher NOx emissions. Conversely, retarding the injection timing relative to this baseline results in lower NOx emissions, but higher PM emissions. This tradeoff is not linear and in practice, the maximum injection retard that can be used is determined by the point at which the PM emissions become unacceptably high. This practical limitation to injection timing is more severe when exhaust gas recirculation (EGR) is used, as it has a tendency to increase PM emissions. By combining the PM reduction potential of oxygenated fuels and water injection, it is possible to retard the injection timing further than would otherwise be possible, and obtain larger simultaneous reductions in NOx and PM emissions.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method for reducing NOx and smoke emissions from a compression combustion engine, the method comprising injecting water and an oxygenated fuel into a combustion chamber of the engine,
    wherein the composition of the injected water and oxygenated fuel is changed in response to actual engine operating conditions.

2. The method according to claim 1, wherein the water and the oxygenated fuel are co-injected into the chamber by a single injector.

3. The method according to claim 1, wherein the water is injected as part of an emulsified fuel containing the water and a non-oxygenated fuel.

4. The method according to claim 3, wherein the emulsified fuel is a primary fuel supply for a combustion process that takes place within the combustion chamber.

5. The method according to claim 1, further comprising supplying exhaust gas to the combustion chamber.

6. The method according to claim 1, wherein the water comprises up to about 60% by volume of the total liquid injected into the combustion chamber.

7. The method according to claim 1, wherein the water comprises from about 10% to about 40% of the total liquid injected into the combustion chamber.

8. The method according to claim 1, wherein the water comprises from about 20% to about 30% of the total liquid injected into the combustion chamber.

9. The method according to claim 1, wherein the oxygenated fuel contains about 4% oxygen.

10. The method according to claim 6, wherein the oxygenated fuel contains about 4% oxygen.

11. The method according to claim 1, wherein the oxygenated fuel comprises from about 40% to about 90% of the total liquid injected into the combustion chamber.

12. The method according to claim 6, wherein the oxygenated fuel comprises from about 40% to about 90% of the total liquid injected into the combustion chamber.

13. The method according to claim 1, wherein the oxygenated fuel comprises from about 70% to about 80% of the total liquid injected into the combustion chamber.

14. The method according to claim 6, wherein the oxygenated fuel comprises from about 70% to about 80% of the total liquid injected into the combustion chamber.

15. The method according to claim 7, wherein the oxygenated fuel comprises from about 70% to about 80% of the total liquid injected into the combustion chamber.

16. The method according to claim 8, wherein the oxygenated fuel comprises from about 70% to about 80% of the total liquid injected into the combustion chamber.

17. The method according to claim 1, wherein the oxygenated fuel includes at least one of: a dymethoxymethane (DMM or methylal), a dymethil ether (DME), a diethyl ether (DEE), a dimethylacetal (DMA), a diethylene-glycol-dimethyl-ether (DGM), an ethylene glycol mono n-butyl ether (ENB), a 2-ethylexyl acetate (EHA), a di-n-butyl ether (DBE), a methyl soy ester (MSE), a decanoic acid (DCA), an octanol, an ethanol and a methanol.

\* \* \* \* \*